June 19, 1962     O. LANG     3,039,447
MULTI-CYLINDER INTERNAL COMBUSTION ENGINE
Filed Oct. 1, 1958
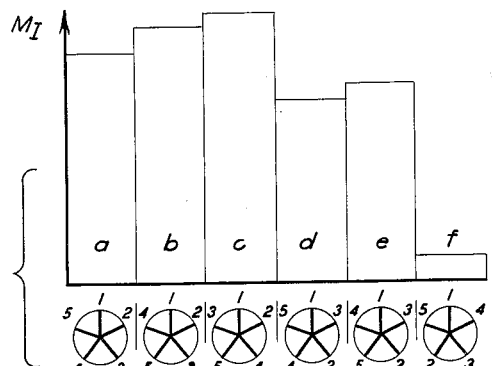
FIG. 1.
FIG. 1a.
FIG. 1b.
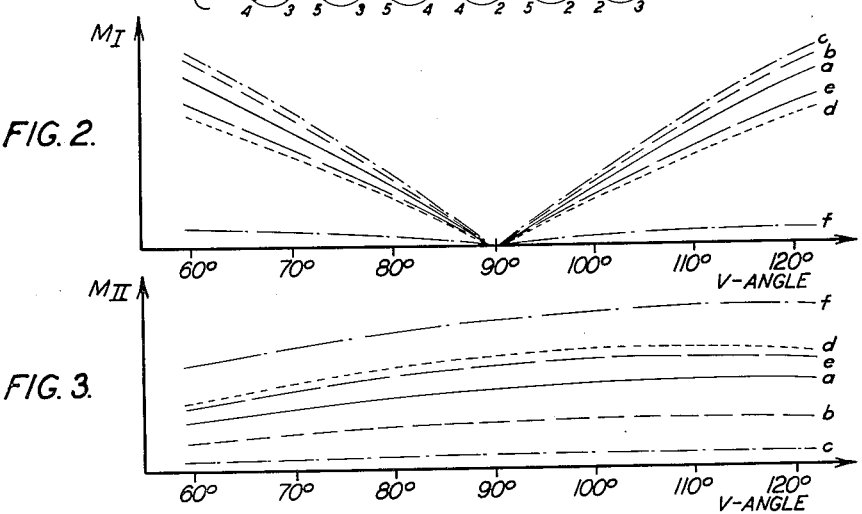
FIG. 2.
FIG. 3.
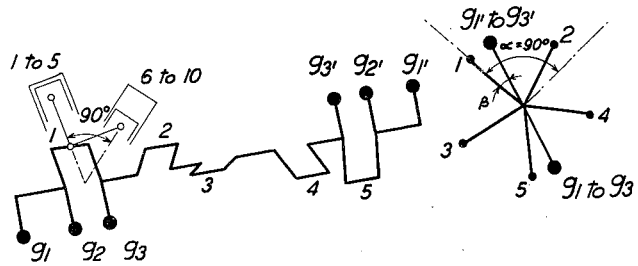
FIG. 4.
FIG. 5.
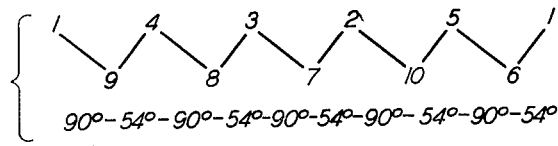
FIG. 6.
FIG. 6a.
FIG. 6b.
90°–54°–90°–54°–90°–54°–90°–54°–90°–54°
INVENTOR.
OTTO LANG
BY Dicke and Craig
ATTORNEYS United States Patent Office 3,039,447
Patented June 19, 1962

3,039,447
MULTI-CYLINDER INTERNAL COMBUSTION ENGINE
Otto Lang, Stuttgart-Wangen, Germany, assignor to Daimler-Benz Aktiengesellschaft, Stuttgart-Unterturkheim, Germany
Filed Oct. 1, 1958, Ser. No. 764,658
Claims priority, application Germany Oct. 2, 1957
11 Claims. (Cl. 123—55)

The present invention relates to a four-cycle internal combustion engine, and more particularly to a ten-cylinder, four-cycle internal combustion engine for motor vehicles.

Ten-cylinder internal combustion engines have not been used heretofore in practice to any great exent as internal combustion engine apparently by reason of the fact that, in general, relatively high tilting moments or bending couples occur therein with equal ignition spacings, i.e., with equal spacings or phase displacements in the firing sequence of cylinders.

In contrast thereto, the present invention consists of a ten-cylinder engine operating as a four-cycle internal combustion engine in which the tilting moments or bending couples of the first degree are eliminated either entirely or nearly entirely and in which tilting moments or bending couples of second degree occur only to a relatively slight extent.

The present invention essentially consists in that the engine is constructed as a V-type engine having a five-throw crankshaft with five cranks and in which each pair of cylinders with the two cylinders thereof inclined with respect to each other by 90° or nearly 90° are provided with one piston each acting on one and the same crank of the crankshaft.

Preferably, the ignition sequence thereof is so selected that alternately a cylinder of one row and a cylinder of the other row inclined with respect to the first row of the V-engine is ignited, whereas the ignition spacings or displacements of the cylinders amount alternately to 90° and 54°.

With a cylinder sequence of 1–2–3–4–5 of the one row, a crankshaft is preferably used in which the cranks of the crankshaft follow one another in the circumferential direction in the sequence of 1–2–4–5–3 of the cylinders, while with a cylinder sequence 6–7–8–9–10 of the other row arranged in a manner similar to the first-mentioned cylinder sequence, an ignition sequence of 1–9–4–8–3–7–2–10–5–6–1 is provided.

Accordingly, it is an object of the present invention to provide an internal combustion engine in which ten cylinders are provided in such a manner as to minimize the second degree tilting moments or bending couples which occur therein while at the same time enabling an external balance of the forces and a reduction of the first degree tilting moments or bending couples to zero.

Still another object of the present invention is the provision of an internal combustion engine, preferably of the V-type, in which all bending moments or couples and forces are either reduced to zero or minimized as much as possible while at the same time enabling the use of a large number of cylinders the free forces of which may be readily balanced externally.

A still further object of the present invention is the provision of a V-type internal combustion engine using ten cylinders, arranged in rows of five cylinders inclined with respect to each other in such a manner that relatively slight first and second degree tilting moments or bending couples occur in the longitudinal direction of the crankshaft during operation thereof.

These and other objects, features and advantages of the present invention will become more obvious from the following description when taken in connection with the accompanying drawing, which shows, for purposes of illustration only, one embodiment in accordance with the present invention, and wherein FIGURE 1 is a diagrammatic showing of the respective amplitudes of the tilting moments or bending couples $M_I$ of first order (FIG. 1a) in a crankshaft in accordance with the present invention for six different crankshaft arrangements or embodiments (a) through (f) with corresponding end views thereof being schematically shown in FIGURE 1b below respective amplitudes of first degree bending couples.

FIGURE 2 is a diagrammatic showing of the tilting moment or bending couples $M_{II}$ of second degree for the different crankshaft arrangements or embodiments plotted against the V-angle of the engine.

FIGURE 3 is a diagrammatic showing of the tilting moments or being couples $M_{II}$ of second degree for the six different crankshaft arrangements or embodiments also plotted against the V-angle of the engine.

FIGURE 4 is a schematic perspective view of a five-throw crankshaft with counterweights in accordance with the present invention.

FIGURE 5 is a schematic end view of the crankshaft shown in FIGURE 4, and

FIGURE 6 is a schematic showing of the sequence of ignition of the engine (FIGURE 6a) and of the iginition spacing or phase displacement between the individual ignitions of the cylinders (FIGURE 6b).

Basically, the ten-cylinder, V-type engine having a five-throw crankshaft offers the advantage that the free forces of the first, second, fourth, sixth and eighth degree or order are balanced. Consequently, only the free forces of the tenth degree or order have to be considered. Furthermore, with the use of such a construction, no free couples or moments occur up to the second order or degree, inclusive; for it has been determined that the first free moment or couple occurs at the 2.5th order. In contradistinction thereto, the five-throw crankshaft is no longer symmetrical in the longitudinal direction thereof and therewith is no longer free of tilting moments or bending couples. The size of the tilting moment or bending couple is thereby largely influenced by the arrangement of the cranks as seen in the central symmetrical crankshaft end view, which enables a very far-reaching force and moment or couple balance.

Altogether twenty-four varations are possible with respect to the crank sequence for the end view of a five-throw crankshaft. However, twelve variations thereof are mirror-like symmetrical and therewith identical. Of the remaining twelve possibilities, two arrangements each are partially mirror-like symmetrical, i.e., for all practical purposes, produce the same conditions so that the following six basically different possibilities (a), (b), (c), (d), (e) and (f) remain for the sequence of the cranks in the direction of rotation of the crankshaft whereby the cranks are designated corresponding to the cylinders coordinated thereto:

(a)  1–2–3–4–5
(b)  1–2–3–5–4
(c)  1–2–4–5–3
(d)  1–3–2–4–5
(e)  1–3–2–5–4
(f)  1–4–3–2–5

Referring now to the drawing, and more particularly to FIGURE 1, the tilting moments or bending couples of the first degree which are the same for all V-angles α and which may be compensated or balanced by counterweights, are shown therein in their respective amplitudes for the six different arrangements or embodiments (a) through (f) of the cranks for purposes of comparison with one another. More particularly, FIGURE 1a shows the tilting moments or bending couples of first degree which may be balanced by appropriate counterweights for the six different crankshaft sequences (a) through (f) mentioned hereinabove with the corresponding crankshaft end views thereof schematically indicated in FIG. 1b for the six embodiments (a) through (f) below respective tilting moments or bending couples of first order. As may be readily seen from FIG. 1, the tilting moment or bending couple of first degree to be balanced is largest with the embodiment (c) having a crank sequence of 1-2-4-5-3, whereas with the embodiment (f) having a crank sequence 1-4-3-2-5 this first degree tilting moment or bending couple which is to be balanced is smallest.

FIGURE 2 shows a diagram in which the portion of the tilting moments or bending couples $M_I$ of first order which cannot be balanced by counterweights are plotted against the V-angle of the internal combustion engine for the six different crank sequences (a) through (f). The full line curve in FIG. 2 as well as in FIG. 3 corresponds to the crank-sequence or arrangement (a) of FIGURE 1, the medium-sized dash line to the crank-sequence or arrangement (b), the medium-sized dot-and-dash line to the crank-sequence or arrangement (c) the short-dash line to the crank-sequence or arrangement (d), the long-dash line to the crank-sequence or arrangement (e), and the long-dash-and-dot line to the crank-sequence or arrangement (f).

As may also be readily determined from FIGURE 2, the tilting moment or bending couple of the first order which cannot be balanced by counterweights is equal to zero for all crank-sequences with a V-angle of 90° so that with correspondingly arranged and dimensioned counterweights a tilting moment or bending couple of the first order about an axis perpendicular to the crankshaft axis caused by the dissymmetry of the crankshaft does no longer occur. For a V-angle deviating above and below from the 90° value thereof, the tilting moment or bending couple of first degree which cannot be balanced increases relatively rapidly, especially also for the embodiment (c), whereas the embodiment (f) only produces a relatively small tilting moment or bending couple of first degree which cannot be balanced.

The conditions for the tilting moments or bending couples of the second order or degree, however, are basically the reverse from those of the first order bending couples. In FIGURE 3, the tilting moments of the second order $M_{II}$ are again plotted against the V-angle of the engine. The tilting moments or bending couples of the second order are largest with all V-angles for the embodiment (f), whereas these second degree tilting moments or bending couples are smallest with all V-angles for the embodiment (c). As a result of this analysis, it may be seen that the most favorable arrangement of a ten-cylinder V-type internal combustion engine having a five-throw crankshaft is that of the embodiment (c) if simultaneously therewith the V-angle thereof is about 90°. In that case, the tilting moments or bending couples of first degree, which otherwise cannot be balanced by counterweights and otherwise would be relatively large, are equal to zero, whereas the tilting moments or bending couples of the second degree amount to a minimum.

FIGURE 4 is a schematic perspective view of a crankshaft in accordance with the present invention of the embodiment (c) of FIGURES 1a and 1b, whereas FIGURE 5 shows the corresponding end view of the crankshaft. The V-angle α thereof amounts to 90° or at least nearly 90,° i.e., the cylinders of the row 1 to 5, on the one hand, and of the row 6 to 10, on the other, are arranged with respect to each other at an angle α of 90° whereby the pistons of two opposite cylinders are pivotally connected with the respective piston rods thereof at the same crank, for example, as shown schematically in FIGURE 4, at the crank 1.

A complete balance of the tilting moments or bending couples of the first degree is achieved by the counterweights, $g_1$, $g_2$, $g_3$ and $g_1'$, $g_2'$, $g_3'$ which are directed in opposition to the resulting tilting moment or bending couple and assume the angular position illustrated schematically in FIGURE 5. As may be readily demonstrated by calculations, the angle β between the direction of the counterweights $g_1'$, $g_2'$ and $g_3'$ and of the crank 1 or between the direction of the counterweights $g_1$, $g_2$ and $g_3$ and the crank 5 amount each to about 18°.

FIGURE 6 shows in FIGURE 6a thereof the alternate ignition sequence of the two rows of cylinders 1-2-3-4-5 and 6-7-8-9-10 and in FIGURE 6b thereof the most favorable ignition spacing between the individual ignitions as meausred in degrees of crankshaft rotation. The ignition spacing thereby amounts alternately to 90° and 54°. However, this unequal value of the ignition spacing is without practical significance and without any significant disadvantage for the operation of the engine because of the relatively large number of cylinders.

A further significant advantage of the embodiment (c) of the crank-sequence with the ignition sequence illustrated in FIGURE 6 consists of the following:

Altogether, with a crankshaft arrangement or embodiment (c), the following sixteen ignition sequences are possible:

(1) 1-2-4-5-3-7-9-10-8-6-1
(2) 1-2-4-5-6-7-9-10-8-3-1
(3) 1-2-4-8-3-7-9-10-5-6-1
(4) 1-2-4-8-5-7-9-10-5-3-1
(5) 1-2-10-5-3-7-9-4-8-6-1
(6) 1-2-10-5-6-7-9-4-8-3-1
(7) 1-2-10-8-3-7-9-4-5-6-1
(8) 1-2-10-8-6-7-8-4-5-3-1
(9) 1-9-4-5-3-7-2-10-8-6-1
(10) 1-9-4-5-6-7-2-10-8-3-1
(11) 1-9-4-8-3-7-2-10-5-6-1
(12) 1-9-4-8-6-7-2-10-5-3-1
(13) 1-9-10-5-3-7-2-4-8-6-1
(14) 1-9-10-5-6-7-2-4-8-3-1
(15) 1-9-10-8-3-7-2-4-5-6-1
(16) 1-9-10-8-6-7-2-4-5-3-1

All the ignition sequences with the exception of the one illustrated in FIGURE 6 and corresponding to the above-listed ignition sequence (11) require unequal or dissimilar control shafts for the injection pumps and for the valve-actuating cam-shafts controlling the cylinders insofar as one pump each and one valve-actuating cam-shaft is used per row of cylinders. Furthermore, when combining the gas discharge or exhaust conduits, for example, for purposes of driving an exhaust gas turbine, at the most two cylinders of one row having an ignition spacing of 280°, on the one hand, and of 430°, on the other, may be combined with the same manifold. Consequently, with all of these ignition sequences, other than sequence (11), different exhaust conduits would have to be used. Only with the ignition sequence (11) corresponding to the embodiment (c) illustrated in FIGURE 6, the same control shafts or cam shafts as well as an identical combining of the exhaust-gas conduits or manifolds is possible.

While I have shown and described one embodiment in accordance with the present invention, it is understood that the same is not limited thereto but is susceptible of many changes and modifications within the scope and spirit of the present invention, and I therefore do not wish to be limited to the details illustrated herein but intend to cover all such changes and modifications as are encompassed by the scope of the appended claims.

I claim:
1. A ten-cylinder, four-cycle internal combustion engine, especially for motor vehicles, comprising a V-type engine having a five-throw crankshaft, and two rows of cylinders each having five cylinders, one row of cylinders being disposed at least nearly 90° with respect to the other row of cylinders, said cylinders being provided with pistons reciprocating therein, the pistons of the two essentially opposite cylinders disposed 90° with respect to each other cooperating with the same throw of said crankshaft, and wherein alternately one cylinder of one row and one cylinder of the other row of said V-type engine are fired with the ignition spacings being alternately essentially 90° and 54°.

2. A ten-cylinder, four-cycle internal combustion engine according to claim 1, wherein the cranks of said crankshaft follow one another in the sequence of 1-2-4-5-3 of the cylinders as measured in the circumferential direction.

3. A ten-cylinder, four-cycle internal combustion engine, especially for motor vehicles, comprising a V-type engine and having a five-throw crankshaft, and two rows of cylinders each having five cylinders, one row of cylinders being disposed at least nearly 90° with respect to the other row of cylinders, said cylinders being provided with pistons reciprocating therein, and the pistons of the two essentially opposite cylinders disposed 90° with respect to each other cooperating with the same throw of said crankshaft, the cranks of said crankshaft following one another in the sequence of 1-2-4-5-3 of the cylinders as measured in the circumferential direction.

4. A ten-cylinder, four-cycle internal combustion engine, especially for motor vehicles, comprising a V-type engine having a five-throw crankshaft, and two rows of cylinders each having five cylinders, one row of cylinders being disposed at least nearly 90° with respect to the other row of cylinders, said cylinders being provided with pistons reciprocating therein, the pistons of the two essentially opposite cylinders disposed 90° with respect to each other cooperating with the same throw of said crankshaft, and the ignition sequence being 1-9-4-8-3-7-2-10-5-6-1 for a similar cylinder sequence 1-2-3-4-5 of the one row and 6-7-8-9-10 of the other row of said cylinders arranged in a V-like manner.

5. A ten-cylinder, four-cycle internal combustion engine, especially for motor vehicles, comprising a V-type engine having a five-throw crank shaft with a plurality of main bearings, two rows of cylinders each having five cylinders, one row of cylinders being disposed at least nearly 90° with respect to the other row of cylinders, said cylinders being provided with pistons reciprocating therein, the pistons of each pair of the two cylinders disposed 90° with respect to each other cooperating with the same throw of said crankshaft, and counter weight means operatively connected with said crankshaft to minimize the bending couples set up therein by the asymmetry thereof in the longitudinal direction, said counter-weight means being arranged at said crankshaft only at the first and last crank thereof and outside the outermost main bearings thereof.

6. A ten-cylinder, four-cycle internal combustion engine according to claim 5, wherein a plurality of counter-weights each are provided near each end of said crankshaft, and the counterweights at one end are oppositely directed with respect to those at the other end.

7. A ten-cylinder, four-cycle internal combustion engine according to claim 6, wherein each counterweight is displaced by about 18° with respect to one of said cranks.

8. A ten-cylinder, four-cycle internal combustion engine according to claim 7, wherein a set of three counterweights each extending in the same direction are provided at each end of said crankshaft.

9. A ten-cylinder, four-cycle internal combustion engine, essentially for motor vehicles, comprising a V-type engine having a five-throw crankshaft, two rows of cylinders each having five cylinders, one row of cylinders being disposed essentially 90° with respect to the other row of cylinders, said cylinders being provided with pistons reciprocating therein, and the pistons of two essentially opposite cylinders disposed 90° with respect to each other cooperating with the same throw of said crankshaft, the cranks of said crankshaft following one another in a sequence of 1-2-4-5-3 of the cylinders as measured in the circumferential direction and alternately one cylinder of one row and one cylinder of the other row of said engine being fired with the ignition spacings being alternately essentially 90° and 54° and the ignition sequence being 1-9-4-8-3-7-2-10-5-6-1 for a similar cylinder sequence 1-2-3-4-5 of one row and 6-7-8-9-10 of the other row.

10. A ten-cylinder, four-cycle internal combustion engine, especially for motor vehicles, comprising a V-type engine having a five-throw crankshaft with a plurality of main bearings, two rows of cylinders each having five cylinders, one row of cylinders being disposed at least nearly 90° with respect to the other row of cylinders, said cylinders being provided with pistons reciprocating therein, the pistons of each pair of the two cylinders disposed 90° with respect to each other cooperating with the same throw of said crankshaft, and counter-weight means operatively connected with said crankshaft to minimize the bending couples set up therein by the asymmetry thereof in the longitudinal direction, said counterweight means being arranged at said crankshaft only at the first and last crank thereof and including at each end of said crankshaft a set of several counter-weights each extending in substantially the same direction and spaced apart from each other in the axial direction.

11. A ten-cylinder, four-cycle internal combustion engine according to claim 10, wherein the counter-weights at one end of said crankshaft are substantially oppositely directed with respect to those at the other end, and wherein each counter-weight is displaced by about 18° with respect to one of said cranks.

References Cited in the file of this patent

UNITED STATES PATENTS

| | | |
|---|---|---|
| 1,078,919 | Hall | Nov. 18, 1913 |
| 1,285,129 | Goodrich | Nov. 19, 1918 |
| 1,552,215 | Chase | Sept. 1, 1925 |
| 1,780,947 | Schron | Nov. 11, 1930 |
| 1,966,183 | Moorhouse | July 10, 1934 |
| 2,434,038 | Ford | Jan. 6, 1948 |
| 2,817,980 | Eberhard | Dec. 31, 1957 |

FOREIGN PATENTS

| | | |
|---|---|---|
| 211,386 | Great Britain | Feb. 21, 1924 |
| 362,021 | Great Britain | Dec. 3, 1931 |
| 381,018 | Great Britain | Sept. 29, 1932 |